Jan. 9, 1945.   C. F. SWINEHART ET AL   2,367,153
MANUFACTURE OF CUPRIC CHLORIDE
Filed Nov. 15, 1941
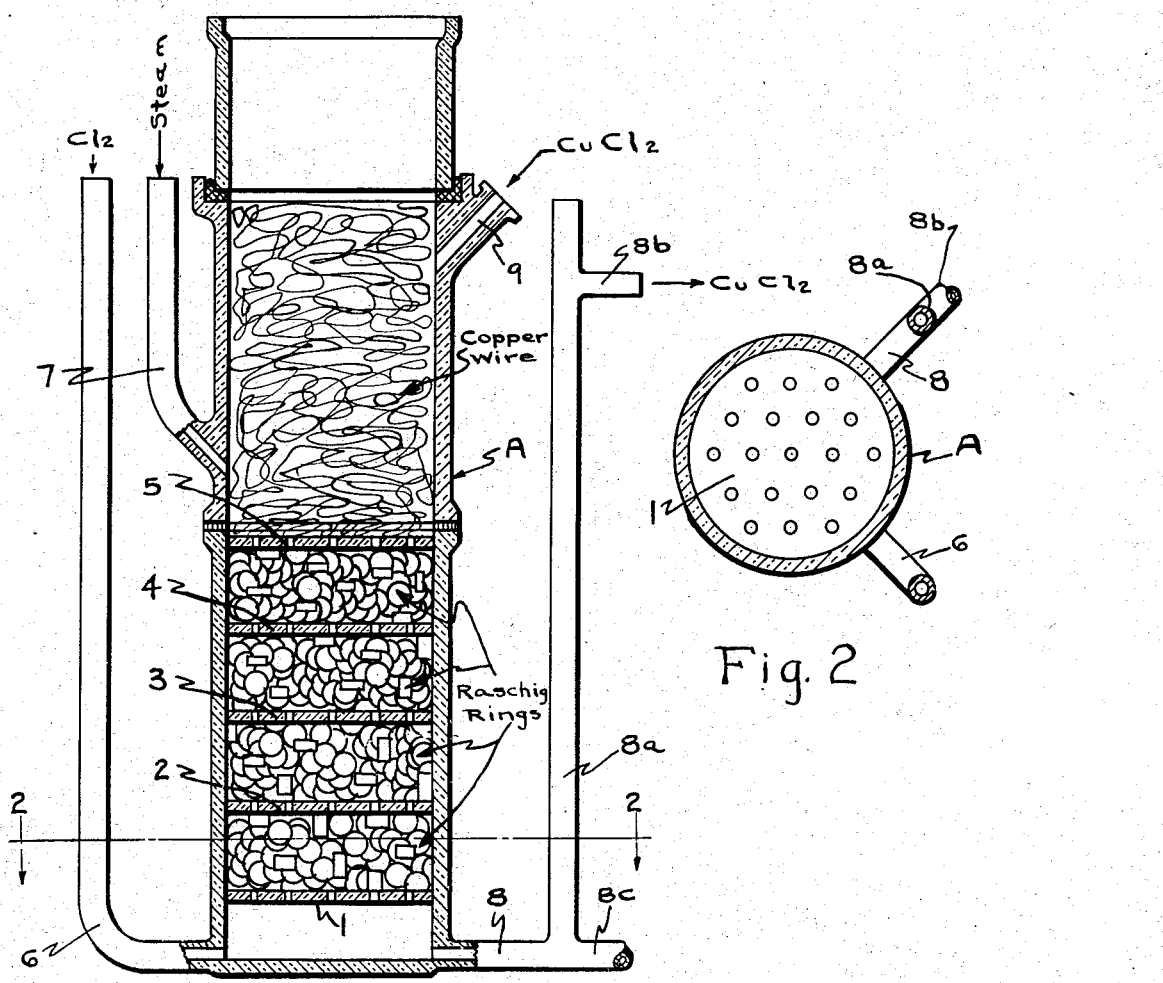
Fig. 1
Fig. 2
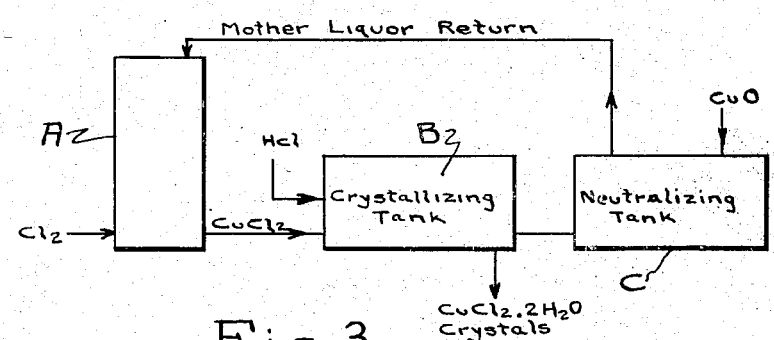
Fig. 3
C. F. Swinehart
J. O. Hay    INVENTORS
BY William H Brown
ATTORNEY.

Patented Jan. 9, 1945

2,367,153

UNITED STATES PATENT OFFICE 2,367,153

MANUFACTURE OF CUPRIC CHLORIDE

Carl F. Swinehart, University Heights, and John O. Hay, Cleveland Heights, Ohio, assignors to The Harshaw Chemical Company, Elyria, Ohio, a corporation of Ohio Application November 15, 1941, Serial No. 419,312

4 Claims. (Cl. 23—97)

This invention relates to the production of cupric chloride and has for its principal object to provide a continuous process for rapid production of such material, involving the use of metallic or massive copper and chlorine as starting materials. A further object is to provide a continuous process by means of which both cupric and cuprous chloride may be produced, making use of the same apparatus and producing optionally cupric chloride or cuprous chloride.

Other and more limited objects will be in part obvious from the following description, and in part pointed out in connection with the accompanying drawing, wherein Fig. 1 is a schematic, vertical, sectional view of apparatus employed in connection with my novel process; Fig. 2 is a section corresponding substantially to the line 2—2 of Fig. 1; and Fig. 3 is a flow diagram illustrating the present preferred embodiment of the process.

Referring now to the accompanying drawing, the process will be described in connection with the apparatus which we prefer to employ.

The reference character A indicates generally a tower which may be composed of chemical stoneware, glass, or the like. The tower A is provided with a series of dividing perforated plates or partitions, 1 to 5, inclusive. Above the perforated plates 1 to 4, inclusive, we provide suitable packing, such as Raschig rings, glass beads, or the like. Above the uppermost plate 5, we provide a suitable quantity of massive copper which may be in the form of wire, clippings, shot, or the like. More copper metal is added as the reaction proceeds.

Chlorine is introduced to the bottom of the tower through the conduit 6, it being understood that this conduit may be connected to a suitable supply of gaseous chlorine, such as a cylinder, tank car, or the like. Steam may be introduced through the conduit 7 in order to produce in the tower a suitable solution temperature to start the reaction and supplement to the extent necessary the heat of reaction in maintaining the solution at suitable working temperature.

However, in the preferred method of operation, heat beyond the heat of reaction is not required to any great extent, if at all, except in starting the reaction. The minimum temperature at which the reaction between cupric chloride and massive copper becomes sufficiently rapid to become self-supporting, and of industrial significance is about 70° C., although this is somewhat dependent on the size of the apparatus and the concentration of the solution. The optimum temperature for the region of the tower in which the above reaction occurs is, however, of the order of 100° C. to 110° C. This gives a high reaction rate, and at the same time permits a relatively high concentration of copper in solution.

The reaction occurring between cupric chloride and copper to form cuprous chloride is the principal reaction which takes place in the region of the tower containing the copper. The solution enriched with cuprous chloride is free to circulate around and through the copper in this (upper) section of the tower containing the copper metal and to a somewhat less extent into the zone directly beneath it. In this zone and under some conditions in the bottom part of the section containing copper wire, there is a considerable amount of reaction between the cuprous chloride and chlorine to form cupric chloride. A substantial portion of this solution richer in cupric chloride is circulated upward through the copper wire, being aided in this recirculation by boiling of the solution if the optimum operating temperature is being maintained.

The net result is the formation in the upper part of the tower of a concentrated solution of cuprous and cupric chloride by two reactions which proceed almost as if at the same location. Nevertheless, they do occur mainly in separate regions of the tower, although the result is such rapid action as almost to suggest direct reaction of chlorine with copper.

A portion of the cuprous and cupric chloride solution passes continuously downward and out of the zone of active recirculation and then progressively through the lower sections of the tower. In the lower part of the tower convection recirculation is effectively reduced by means of perforated baffle plates. In this lower part of the tower, the reaction between cuprous chloride and chlorine is promoted by the counter current flow of the upward passing chlorine, so that the solution drawn from the bottom of the tower is essentially free of all the cuprous chloride and may be practically saturated with cupric chloride and ready to crystallize on cooling.

While a single packed column of suitable length will accomplish the necessary suppression of convection currents and limitation of recirculation, towers with a diameter greater than 6″ or 8″ require a height that is apt to be prohibitively great.

In the preferred method, as illustrated (and described above), the lower part of the tower is considerably decreased in height by being divided into sections or individual cells by means of perforated baffle plates. Each section contains packing whose main function is to promote the absorption of chlorine. The perforated baffle plates serve effectively to suppress recirculation between two such sections so that the cuprous chloride content of the solution is reduced stepwise as it passes downward progressively from section to section.

The highly concentrated cupric chloride solution is drawn off through the conduit 8, normally passing upwardly through the branch 8a, and being drawn off to the crystallizing tank through the branch 8b. The branch 8c may contain a suitable valve or equivalent structure and may be used for draining and removal of sludge. The mother liquor from the crystallizing tank may be returned through the opening 9 at the top of the tower, or may be simply introduced through the open top of the tower.

In Fig. 3, we have shown a flow diagram wherein the tower is indicated by the reference character A, the crystallizing tank is indicated by the reference character B, and a neutralizing tank is indicated by the reference character C. As indicated in Fig. 3, the cupric chloride passes from the tower A to the crystallizing tank B where it is allowed to cool and thereby crystallizes out a portion of the cupric chloride. A small proportion, suitably 10% or less based on $CuCl_2$ content, of hydrochloric acid (calculated as HCl) is preferably added to promote crystallization. From the crystallizing tank, the mother liquor passes to the neutralizing tank C where a sufficient amount of copper oxide is added to nearly neutralize the hydrochloric acid content. Thereafter, the mother liquor or such portion thereof as may be found desirable together with a suitable quantity of water is returned to the tower A, being admitted through the opening 9.

The addition of the hydrochloric acid to the crystallizing tank and subsequent neutralization of most of it is optional, but it is preferred. The hydrochloric acid increases the yield of crystals as well as the rapidity with which they form and thus eliminates evaporation and/or long cooling periods. The neutralization of the excess acid with CuO is economic because at the optimum operating concentrations and temperatures, the greater part of the HCl in such unneutralized mother liquors will be driven off as gas from the tower and will, therefore, constitute a loss. However, a small amount of HCl is permissible and even desirable in order to dissolve any oxide or carbonate of copper which may be introduced as common impurities (oxidized surface coatings, etc.) in commercial metallic copper.

The return of mother liquor to the tower is not essential but is highly desirable, since otherwise it would be necessary to evaporate water therefrom to recover the remaining $CuCl_2 \cdot 2H_2O$ therefrom, at the same time adding water to the tower to maintain the solution of $CuCl_2$ formed.

It is to be recommended that the rate of introduction of chlorine into the tower be such that very little gaseous chlorine, if any, is permitted to escape at the top of the tower. Also, the concentration of cupric chloride should be adjusted, as far as possible, to avoid the recirculation of large quantities of mother liquor. It is possible, however, to operate within rather wide ranges in respect to solution concentration and rate of introduction of chloride, the particular conditions being dictated by considerations of maximum production and operating economy.

In the event it is desired to produce cuprous chloride, liquid may be withdrawn from the top of the tower. On cooling, a portion of the cuprous chloride will crystallize out. The mother liquor then may be returned to the top of the tower there to build up again in cuprous chloride concentration. More cuprous chloride crystals can be obtained if the hot solution from the top of the tower is passed over metallic copper before cooling. Again crystallization is promoted if the solution is diluted with water.

While it is thus obviously possible to make either all $CuCl_2$ or all CuCl, it is preferable to make either all $CuCl_2$ or some of both. If CuCl is the entire product, some concentration by evaporation may be necessary.

While we have shown and described the present preferred embodiment of our invention and have diagrammatically indicated apparatus which may be employed in carrying it out, we do not wish to be limited to the details of the disclosure but only in accordance with the appended claims and the prior art.

What we claim is:

1. Process for producing a copper chloride from metallic copper and chlorine comprising continuously passing chlorine into the bottom section of a tower in the upper section of which metallic copper in such form as to present a large area per unit weight is supported away from said bottom section, maintaining an aqueous solution of chlorides of copper extending to a height in said tower covering at least a portion of said metallic copper, distributing the chlorine gas in tortuous flow in said solution below and into said upper portion, continuously withdrawing solution from said tower and removing a copper chloride from the solution so withdrawn.

2. Process for producing cupric chloride from metallic copper and chlorine comprising continuously passing chlorine into the bottom section of a tower in the upper section of which metallic copper in such form as to present a large area per unit weight is supported away from said bottom section, maintaining an aqueous solution of chlorides of copper extending to a height in said tower covering at least a portion of said metallic copper, distributing the chlorine gas in tortuous flow in said solution below and into said upper portion, continuously withdrawing solution from the bottom of said tower and removing cupric chloride from the solution so withdrawn.

3. Process for producing cuprous chloride from metallic copper and chlorine comprising continuously passing chlorine into the bottom section of a tower in the upper section of which metallic copper in such form as to present a large area per unit weight is supported away from said bottom section, maintaining an aqueous solution of chlorides of copper extending to a height in said tower covering at least a portion of said metallic copper, distributing the chlorine gas in toruous flow in said solution below and into said upper portion, continuously withdrawing solution from the top of said tower and removing cuprous chloride from the solution so withdrawn.

4. Process for producing cupric chloride from metallic copper and chlorine comprising passing chlorine into the bottom section of a tower in the upper section of which metallic copper in such form as to present a large area per unit weight is supported away from said bottom section, maintaining an aqueous solution of chlorides of copper extending to a height in said tower covering at least a portion of said metallic copper, distributing the chlorine gas in tortuous flow in said solution below and into said upper portion, withdrawing cupric chloride solution from the bottom section of said tower, crystallizing cupric chloride from said solution, and returning mother liquor to the upper section of said tower.

CARL F. SWINEHART.
JOHN O. HAY.